(12) United States Patent (10) Patent No.: US 8,356,243 B2
Rosen et al. (45) Date of Patent: *Jan. 15, 2013

(54) SYSTEM AND METHOD FOR STRUCTURING SPEECH RECOGNIZED TEXT INTO A PRE-SELECTED DOCUMENT FORMAT

(75) Inventors: Lee Rosen, Milford, CT (US); Ed Roe, Plant City, FL (US); Wade Poust, Hickory, NC (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,688

(22) Filed: May 5, 2011

(65) Prior Publication Data

US 2011/0231753 A1 Sep. 22, 2011

Related U.S. Application Data

(63) Continuation of application No. 10/375,045, filed on Feb. 28, 2003, now Pat. No. 7,958,443.

(51) Int. Cl.
*G06F 17/21* (2006.01)
*G06F 17/20* (2006.01)

(52) U.S. Cl. ........................ 715/224; 715/223

(58) Field of Classification Search ........... 715/221–226
See application file for complete search history.

(56) References Cited

U.S. PATENT DOCUMENTS

| | | | |
|---|---|---|---|
| 5,689,585 A | 11/1997 | Bloomberg et al. | |
| 5,809,318 A | 9/1998 | Rivette et al. | |
| 5,875,429 A | 2/1999 | Douglas | |
| 5,883,986 A | 3/1999 | Kopec et al. | |
| 5,915,254 A | 6/1999 | Nakayama et al. | |
| 5,924,068 A * | 7/1999 | Richard et al. | 704/260 |
| 5,950,214 A | 9/1999 | Rivette et al. | |
| 5,991,780 A | 11/1999 | Rivette et al. | |
| 6,052,657 A | 4/2000 | Yamron et al. | |
| 6,100,882 A | 8/2000 | Sharman et al. | |
| 6,108,629 A * | 8/2000 | Kasday | 704/258 |
| 6,279,017 B1 | 8/2001 | Walker | |

(Continued)

FOREIGN PATENT DOCUMENTS

JP 06-083807 3/1994

(Continued)

OTHER PUBLICATIONS

M. Rayner et al., Combining Knowledge Sources to Reorder N-Best Speech Hypothesis List, Proceedings DARPA Speech and Natural Language Workshop, 1994; http://acl.ldc.upenn.edu/H/H94/H94-1040.pdf.

(Continued)

*Primary Examiner* — Samuel G Neway
(74) *Attorney, Agent, or Firm* — Wolf, Greenfield & Sacks, P.C.

(57) ABSTRACT

A system for creating a structured report using a template having at least one predetermined heading and formatting data associated with each heading. The steps include recording a voice file, creating a speech recognized text file corresponding to the voice file, identifying the location of each heading in the text file, and the text corresponding thereto, populating the template with the identified text corresponding to each heading, and formatting the populated template to create the structured report.

16 Claims, 1 Drawing Sheet

U.S. PATENT DOCUMENTS

| | | | |
|---|---|---|---|
| 6,529,902 | B1 | 3/2003 | Kanevsky et al. |
| 6,789,060 | B1 * | 9/2004 | Wolfe et al. .................... 704/235 |
| 6,865,258 | B1 * | 3/2005 | Polcyn ........................ 379/88.01 |
| 6,915,254 | B1 | 7/2005 | Heinze et al. |
| 7,958,443 | B2 | 6/2011 | Rosen et al. |
| 2002/0002459 | A1 | 1/2002 | Lewis et al. |
| 2002/0091713 | A1 | 7/2002 | Walker |
| 2002/0099717 | A1 * | 7/2002 | Bennett ......................... 707/102 |
| 2003/0018668 | A1 | 1/2003 | Britton et al. |
| 2003/0145282 | A1 | 7/2003 | Thomas et al. |
| 2004/0111265 | A1 | 6/2004 | Forbes |
| 2004/0243545 | A1 | 12/2004 | Boone et al. |
| 2012/0095751 | A1 | 4/2012 | Peters et al. |

FOREIGN PATENT DOCUMENTS

| | | |
|---|---|---|
| JP | 2000-200273 | 7/2000 |

OTHER PUBLICATIONS

M. Ostendorf et al., Integration of Diverse Recognition Methodologies through Reevaluation of N-Best Sentence Hypotheses, Proceedings of DARPA and Natural Language Workshop, 1991; http://acl.ldc.upenn.edu/H/H91/H91-1013.pdf.

L. Norton et al., Recent Improvements and Benchmark Results for the Paramax ATIS System, Proceedings of DARPA Workshop on Speech and Natural Language, 1992; http://acl.ldc.upenn.edu/H/H92/H92-1017.pdf.

R. C. Moore, Integration of Speech with Natural Language Processing, Voice Communication Between Humans and Machines, National Academy of Sciences, 1994, pp. 254-271; http://www.pnas.org/cgi/reprint/92/22/9983.

J. Kupiec, Probabilistic Models of Short and Long Distance Word Dependencies in Running Text, Proceedings of DARPA Speech and Natural Language Workshop, 1992, pp. 290-295; http://acl.ldc.upenn.edu/H/H89/H89-1054.pdf.

H. Murveit et al., Integrating Natural Language Constraints into HMM-Based Speech Recognition, IEEE, 1990, pp. 573-576.

G. Maltese et al., An Automatic Technique to Include Grammatical and Morphological Information in a Trigram-Based Statistical Language Model, IEEE International Conference on Acoustics, Speech, and Signal Processing, 1992, pp. 157-160.

R. Schwartz et al., On Using Written Language Training Data for Spoken Language Modelling, Proceedings of Human Language Technology Workshop, Morhan Kaufmann Publishers, Inc., 1994, pp. 94-98; http://acl.ldc.upenn.edu/H/H94/H94-1016.pdf.

E. K. Ringger et al., Error Correction via a Post-Processor for Continuous Speech Recognition, In Proc. of ICASSP-96 IEEE-96, 1996.

G. Grefenstette et al., What is a Word, What is a sentence? Problems of Tokenization, $3^{rd}$ Conference on Computational Lexicography and Text Research. Complex '94, Budapest, Jul. 7-10, 1994.

J.C. Reynar et al., A Maximum Entropy Approach to Identifying Sentence Boundaries. In Proceedings of the Fifth Conference on Applied Natural Language Processing, Washington D.C., 1997: 16-19.

H. Schmid, Unsupervised Learning of Period Disambiguation for Tokenisation. Internal Report, IMS, University of Stuttgart, May 2000.

D. Yarowsky, Homograph Disambiguation in Text-to-Speech Synthesis. In J. van Santen, R. Sproat, J. Olive and J. Hirschberg (eds.), Progress in Speech Synthesis. Springer-Verlag, 1996: 159-175.

D. Yarowsky, Decision Lists for Lexical Ambiguity Resolution: Application to Accent Restoration in Spanish and French. In Proceedings of the $32^{nd}$ Annual Meeting of the Association for Computational Linguistics. Las Cruces, NM, 1994: 88-95.

D. Yarowsky, A Comparison of Corpus-based Techniques for Restoring Accents in Spanish and French Text. In Proceedings, $2^{nd}$ Annual Workshop on Very Large Corpora. Kyoto, 1994: 19-32.

R. Sproat, Multilingual Text Analysis for Text-to-Speech Synthesis, ECAI Workshop on Extended Finite-State Models of Language, Aug. 1996, 1996.

R. Sproat et al., Normalization of Non-standard Words, Computer Speech and Language 15(3) 2001: 287-333.

Japanese Office Action from Japanese Application No. : JP 2006-540706 dated Jul. 8, 2010.

U.S. Appl. No. 10/447,290, filed May 29, 2003 by Boone et al.

L. Hirschman, The Roles of Language Processing in a Spoken Language Interface, Voice Communication Between Humans and Machines, National Academy of Sciences, 1994, pp. 217-237; http://www.pnas.org/cgi/reprint/92/22/9970.

D.D. Palmer et al., Adaptive Multilingual Sentence Boundary Disambiguation, Computational Linguistics 23(2), 1997.

A. Mikheev, Tagging Sentence Boundaries. In NACL '2000 (Seattle), ACL Apr. 2000: 264-271.

T. Strzalkowski et al., A Natural Language Correction Model for Continuous Speech Recognition, Proceedings of the Fifth Workshop on Very Large Corpora, pp. 168-177, Aug. 1997; http://acl.ldc.upenn.edu/W/W97/W97-0117.pdf.

* cited by examiner

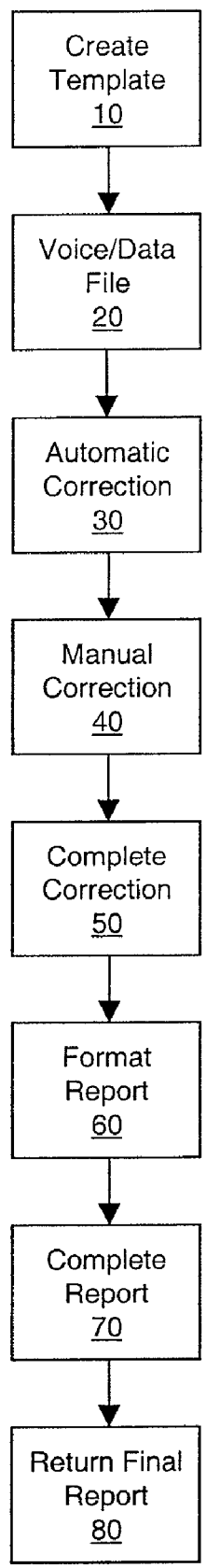

SYSTEM AND METHOD FOR STRUCTURING SPEECH RECOGNIZED TEXT INTO A PRE-SELECTED DOCUMENT FORMAT

RELATED APPLICATIONS

This Application is a continuation of U.S. application Ser. No. 10/375,045, entitled "SYSTEM AND METHOD FOR STRUCTURING SPEECH RECOGNIZED TEXT INTO A PRE-SELECTED DOCUMENT FORMAT" filed on Feb. 28, 2003, which is herein incorporated by reference in its entirety.

BACKGROUND OF INVENTION

The present invention relates generally to structuring, correcting, and formatting speech recognized text.

Today's speech recognition technology enables a computer to transcribe spoken words into computer recognized text equivalents. Speech recognition is the process of converting an acoustic signal, captured by a transducive element, such as a microphone or a telephone, to a set of words. These words can be used for numerous applications including data entry and word processing. The development of speech recognition technology has traditionally focused on accurate speech recognition, which has been a formidable task due to the wide variety of pronunciations, individual accents, and speech characteristics of individual speakers. Today's leading speech recognition software includes features for continuously learning the vocabulary and grammar of specific users.

Even with this improved speech recognition software, a transcriber or correctionist is often still necessary to correct mistakes. Additionally, a transcriber plays an important role in formatting the outputted text into a pre-determined structured format. Formatting speech recognized text into formatted reports is common in many professions that rely on dictation to maximize efficiency, such as is found in the medical professions. Currently, a transcriber will review and correct the unstructured text, create headings, format certain text, and cut and paste different sections of text in order to create the desired report format. This additional formatting work provides longer transcription times and reduced productivity, thereby mitigating the benefits of speech recognition. What is needed is a system for simplifying this process of structuring and formatting speech recognized text.

SUMMARY OF INVENTION

The present invention overcomes the above-discussed shortcomings and satisfies a significant need for providing a speech recognition correction system that automatically creates a structured report. A system in accordance with certain teachings of the present invention will increase productivity by reducing the number of man-hours necessary to correct speech recognized text that is used for generating standard reports. The steps include creating a template having a user-defined format having at least one predetermined heading, selecting a voice file and a corresponding speech recognized text file, identifying the location of each heading in the text file, and the text corresponding thereto, and populating the template with the identified text corresponding to each heading.

The identifying step contains two phases. The automatic correction phase is carried out by computer which automatically locates and marks each heading in the speech recognized text file. The manual correction phase is carried out by a transcriber who locates any unmarked headings in the speech recognized text file and marks each unmarked heading using a hot key corresponding to each heading that is predefined in the template. The populated template is then converted into a into a word processing file, which is then formatted either automatically or manually into final report. A template created in accordance with the present disclosure may also contain formatting data that corresponds to each heading and can be automatically applied to each heading and corresponding text section in the word processing file. Such formatting data includes but is not limited to font, font size, bolding, underlining, italics, spacing, and alignment.

The above advantages and features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF DRAWINGS

While the specification concludes with claims particularly pointing out and distinctly claiming the present invention, it is believed the same will be better understood from the following description taken in conjunction with the accompanying drawings, which illustrate, in a non-limiting fashion and the best mode presently contemplated for carrying out the present invention, wherein:

FIG. 1 is a flow diagram depicting a system for formatting speech recognition text in accordance with certain teachings of the present invention.

DETAILED DESCRIPTION OF INVENTION

The present disclosure will now be described more fully with reference to FIG. 1 in which a flow diagram showing a preferred embodiment of the present disclosure is shown. The subject matter of this disclosure may, however, be embodied in many different forms and should not be construed as being limited to the embodiments set forth herein.

Referring to FIG. 1, a flow diagram generally illustrates the steps for formatting unstructured speech recognized text in accordance with certain teachings of the present disclosure. First, as shown in Box 10, a template is created identifying the section headings and the formatting information for a final report. It is intended that such a template can be created by a programmer for a single specific application, or can be created by a template wizard as part of a speech recognition correction software package. The template is designed to store headings that are assigned an indicator, and are preferably associated with a special keystroke, which can ultimately be used to manually mark and identify a heading in a speech recognized text file. When used within a speech recognized text file, each heading indicator can be saved in its particular location within the text file. Hundreds of headings can be associated with a template depending on the requirements for each template. Other formatting characteristics, such as font characteristics (type, size, bolding, italics, underlining, etc.) and alignment, can also be added to the template in order to automatically format the final report format.

Box 20 represents the first step of the correction process in which a voice/data wave file is created. A voice wave file is recorded using traditional methods for dictation recording. While speaking, the dictator should dictate section headings prior to stating the information that belongs in that section of the report. These section headings should correspond with the exact section headings stored in the template created in Box 10. For example, a doctor dictating the family history of a patient would dictate the heading FAMILY HISTORY prior to discussing the family history of a patient (presuming that FAMILY HISTORY is a heading stored in the template). After the voice file is created, speech recognition software is used to create a text file corresponding to the voice wave file. This text file is then packaged within the voice wave file to create a voice/data file, which is then stored and ultimately forwarded to a transcriber for corrections.

Box 30 represents the third step of the process in which the correction software retrieves the voice/data file and unpackages it, sending the voice wave data to the media player, and sending the associated text data to the screen in an editor window. The correction software may be included with the speech recognition software or may be a separate software program. The text file is then parsed and displayed on the transcriber's screen in an editor window. The displayed text data now includes not only the text of the transcribed voice file, but also contains the indicators for each section heading, which is automatically marked by the correction software. Either automatically or by prompt, the correction software may also display the text file separated by the automatically recognized section headings within a separate window on the screen. All of the section headings that are available for the template may also be displayed in another window, accompanied by each section's template-defined hot key. This guide can be used by the transcriber to manually add additional section headings and breaks during the manual correction step as described further in Box 40.

Box 40 represents the fourth step of the process where the transcriber makes manual corrections to the text file while listening to the voice wave file. Such manual corrections include but is not limited to correcting misrecognized or unrecognized words, as well as adding new section heading markers in the body of the text. While the voice file is playing from the media player, an indication is displayed in the text coinciding with the voice playback. While making manual corrections, a hot key (such as a function key, for example), which is associated with each section heading in the template, can be used to manually apply section heading markers within the speech recognized text file. This could normally be necessary if the dictator failed to dictate a section heading, misstated a section heading, or if the section heading was otherwise not recognized by the speech recognition software.

Box 50 represents the fifth step of the process, which is completion of the editing process. Once the document has been corrected and all section headings have been identified either automatically (correction software successfully matched the section heading from the text file with template-defined section headings) or manually (transcriber manually entered a template-defined hot key marker that relating to a section heading), the correction process is over. The correction software will have a COMPLETE CORRECTION or similar prompt that can then be used. The correction software will then output the corrected text file into a word processing format, creating a draft report following the template format. This draft report will list each section in order, with each accompanying text section placed under the correct section heading. Furthermore, depending on the format information contained in the template, font characteristics, spacing, and alignment also be applied to this draft report.

Box 60 represents the final step of the correction process in which the transcriber further formats the draft report in the word processing format, including spell checking and alignment. Once the draft report is fully formatted and corrected, the COMPLETE REPORT or similar prompt may be used to save the final report onto the server (Box 70). Finally, the report may then be returned to the dictator as shown in Box 80.

EXAMPLE

The disclosed subject matter will now be described in relation to an illustrative example. A template created for a hospital in accordance with certain teachings of the present disclosure may have the following stored information, including but not limited to the order of each section in the final report, the name of each section heading, an abbreviation used for each heading to be marked in the text file, and a hotkey assigned to each heading for use during manual correction:

| Location | Name | Abbreviation | Hot Key |
|---|---|---|---|
| 1 | Family History | FH | <F1> |
| 2 | Medical History | SH | <F2> |
| 3 | Impression | IM | <F3> |
| 4 | Discharge Summary | DI | <F4> |

While treating a patient, a doctor would record a voice file, clearly stating the name of each section heading prior to dictating the medical impressions for that section. An unstructured speech recognized text file created from such a recording might appear as follows (where the "blah blah . . . represents the medical impressions dictated by the doctor):

FAMILY HISTORY blah blah blah blah . . . MEDICAL HISTORY blah blah blah . . .
DISCHARGE INSTRUCTIONS blah blah blah blah . . . IMPRESSION blah blah . . .

This text file is then packaged with the corresponding voice file and routed to a transcriber. Using a correction software in accordance with certain teachings of the present disclosure, the text file is parsed and each of the heading sections are automatically marked within the text. In this example, note that the doctor mistakenly dictated the heading within the text. In this example, note that the doctor mistakenly dictated the heading DISCHARGE INSTRUCTIONS instead of the template heading DISCHARGE SUMMARY. The transcriber, while making manual corrections, could manually mark DISCHARGE INSTRUCTIONS as a DISCHARGE SUMMARY heading by hitting the <F4> key when the indicator is at the appropriate text.

After manual corrections are complete, the transcriber would hit the COMPLETE CORRECTION prompt, which would generate a draft report in a word processing format. In this draft final report, all section headings and their corresponding text sections would bear all formatting information (font, bolding, alignment, etc.) stored in the template and would appear in the specified template order. In this word processing file, the transcriber then has the ability to spell check the report and correct any other further formatting and alignment issues. A final report for this example, fully formatted, might appear as follows:

A. FAMILY HISTORY
blah blah blah blah . . .

```
B. MEDICAL HISTORY
blah blah blah . . .
C. IMPRESSION
blah blah . . .
D. DISCHARGE INSTRUCTIONS
blah blah blah blah . . .
```

It will be apparent to one of skill in the art that described herein is a novel system for automatically structuring and formatting speech recognized text. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A computer-implemented method for processing input text, the method comprising acts of:
    locating, within the input text, at least one portion of text corresponding to at least one section heading of a plurality of section headings associated with a report template;
    causing a display device to visually display at least one indicator for the at least one section heading to indicate that the at least one portion of text corresponding to the at least one section heading has been located in the input text; and
    using a computer to automatically generate a structured report according to the report template, the structured report having a plurality of sections, the plurality of sections comprising at least one section corresponding to the at least one section heading, the at least one section being populated with the at least one portion of text corresponding to the at least one section heading, wherein the act of causing the display device to visually display at least one indicator comprises causing the display device to display an indicator separate from the structured report.

2. The computer-implemented method of claim 1, wherein:
    the at least one section heading comprises a first section heading and a second section heading;
    the at least one portion of text comprises a first portion of text corresponding to the first section heading and a second portion of text corresponding to the second section heading; and
    the act of using a computer to automatically generate the structured report comprises generating the structured report so that the at least one section comprises a first section that corresponds to the first section heading and is populated with the first portion of text and a second section that corresponds to the second section heading and is populated with the second portion of text.

3. The computer-implemented method of claim 2, wherein the act of using a computer to automatically generate the structured report comprises generating the structured report so that the first and second sections appear in the structured report in an order that is consistent with an ordering of the plurality of section headings specified by the report template.

4. The computer-implemented method of claim 2, wherein:
    the act of causing the display device to visually display at least one indicator for the at least one section heading comprises causing the display device to visually display a first indicator for the first section heading and a second indicator for the second section heading; and
    the first and second indicators are displayed in an order that is consistent with an ordering of the plurality of section headings specified by the report template.

5. The computer-implemented method of claim 1, wherein the act of causing the display device to visually display at least one indicator for the at least one section heading comprises causing the display device to visually display an indicator for every section heading of the plurality of section headings for which a corresponding portion of text is located within the input text.

6. The computer-implemented method of claim 1, further comprising causing the display device to visually display all of the plurality of section headings associated with the report template.

7. The computer-implemented method of claim 1, wherein the input text is generated at least in part by automatically recognizing dictated speech, and wherein the act of locating comprises locating, within the input text, the at least one section heading dictated by a user.

8. The computer-implemented method of claim 1, wherein the act of causing the display device to visually display at least one indicator is performed prior to generating the structured report.

9. A system for processing input text, the system comprising a computer programmed to:
    locate, within the input text, at least one portion of text corresponding to at least one section heading of a plurality of section headings associated with a report template;
    visually display at least one indicator for the at least one section heading to indicate that the at least one portion of text corresponding to the at least one section heading has been located in the input text; and
    generate a structured report according to the report template, the structured report having a plurality of sections, the plurality of sections comprising at least one section corresponding to the at least one section heading, the at least one section being populated with the at least one portion of text corresponding to the at least one section heading, wherein the computer is programmed to display an indicator separate from the structured report.

10. The system of claim 9, wherein:
    the at least one section heading comprises a first section heading and a second section heading;
    the at least one portion of text comprises a first portion of text corresponding to the first section heading and a second portion of text corresponding to the second section heading; and
    the computer is programmed to generate the structured report so that the at least one section comprises a first section that corresponds to the first section heading and is populated with the first portion of text and a second section that corresponds to the second section heading and is populated with the second portion of text.

11. The system of claim 10, wherein the computer is programmed to generate the structured report so that the first and second sections appear in the structured report in an order that is consistent with an ordering of the plurality of section headings specified by the report template.

12. The system of claim 10, wherein:
    the computer is programmed to visually display a first indicator for the first section heading and a second indicator for the second section heading; and
    the first and second indicators are displayed in an order that is consistent with an ordering of the plurality of section headings specified by the report template.

13. The system of claim 9, wherein the computer is programmed to visually display an indicator for every section heading of the plurality of section headings for which a corresponding portion of text is located within the input text.

14. The system of claim 9, wherein the computer is further programmed to visually display all of the plurality of section headings associated with the report template.

15. The system of claim 9, wherein the input text is generated at least in part by automatically recognizing dictated speech, and wherein the computer is programmed to locate, within the input text, the at least one section heading dictated by a user.

16. The system of claim 9, wherein the computer is programmed to visually display the at least one indicator prior to generating the structured report.

\* \* \* \* \*